No. 751,768. PATENTED FEB. 9, 1904.
S. H. WOOSTER.
HARROW.
APPLICATION FILED OCT. 9, 1902.
NO MODEL. 2 SHEETS—SHEET 2.
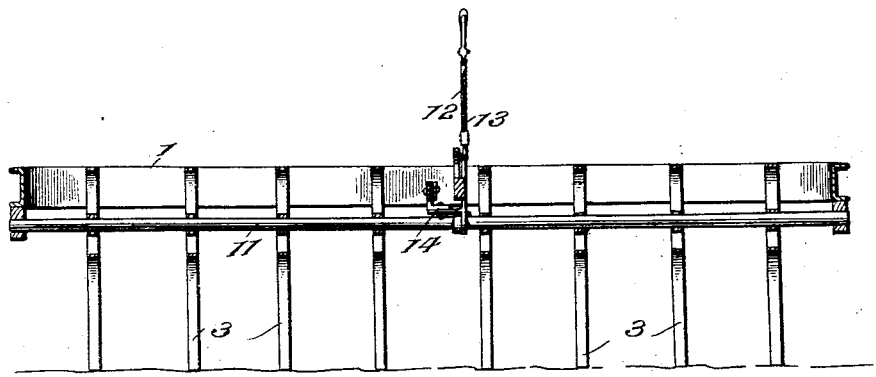
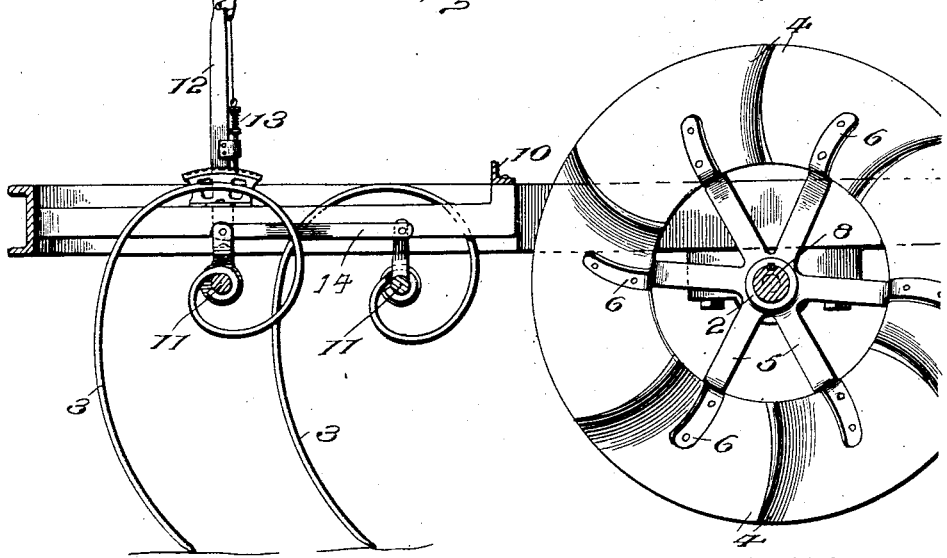
WITNESSES
INVENTOR
S. H. Wooster.

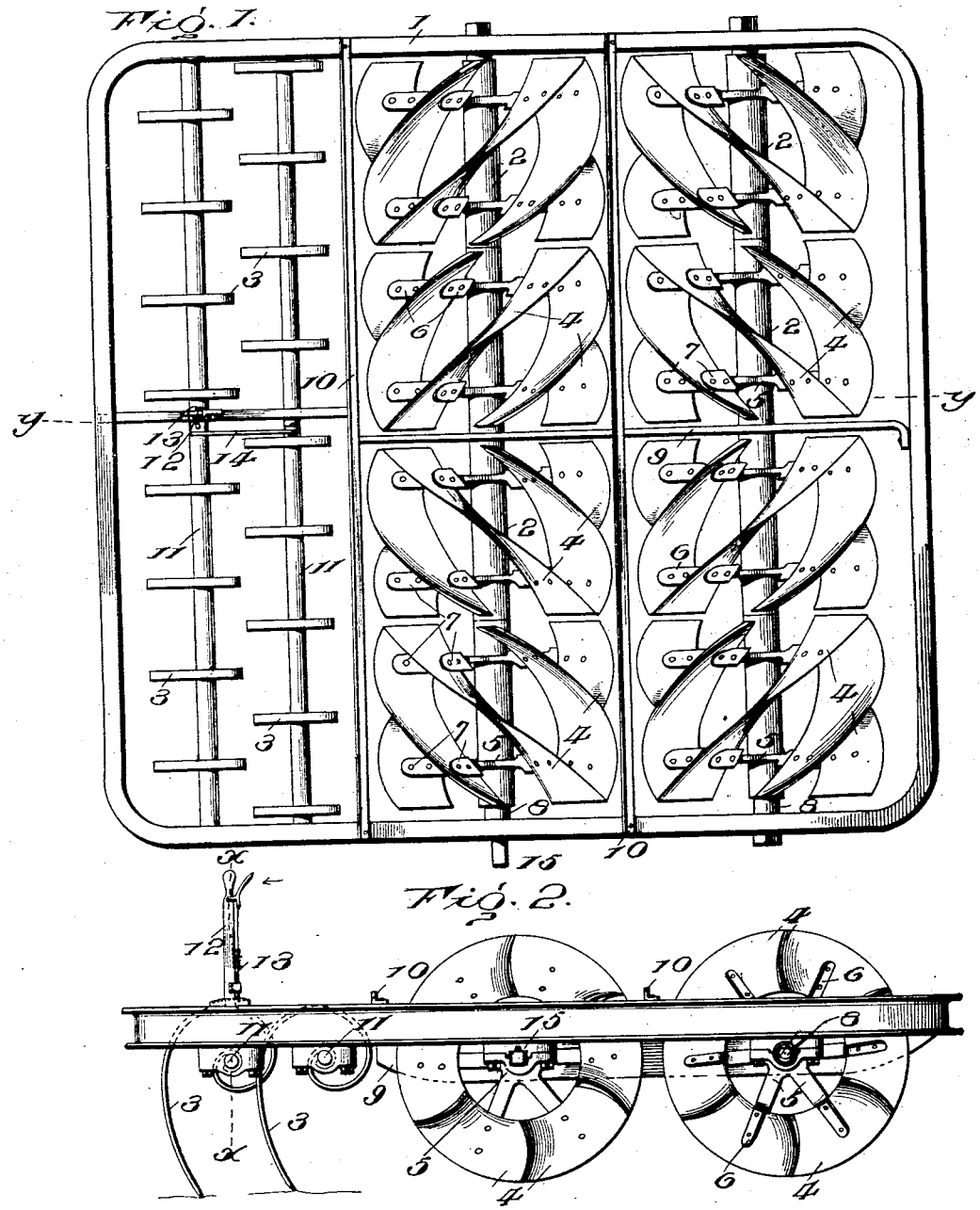

No. 751,768. Patented February 9, 1904.

UNITED STATES PATENT OFFICE.

SILAS H. WOOSTER, OF CHARLOTTE, VERMONT.

HARROW.

SPECIFICATION forming part of Letters Patent No. 751,768, dated February 9, 1904.

Application filed October 9, 1902. Serial No. 126,637. (No model.)

*To all whom it may concern:*

Be it known that I, SILAS H. WOOSTER, a citizen of the United States, residing in Charlotte, county of Chittenden, State of Vermont, have invented a new and useful Harrow, of which the following is a specification.

This invention provides a new and novel structure of harrow for cultivation of the soil, and embodies an assemblance of devices which provide an implement of sufficient power and indeed more especially adapted to pulverize a stubble soil, mainly the prairie soil found in the West, and including the soils of the great wheat belt. The implement is also well adapted for the pulverizing and cultivation of plowed ground.

For a full description of the invention and the merits thereof and also to acquire a knowledge of the details of construction of the means for effecting the result, reference is to be had to the following description and drawings hereto attached.

While the essential and characteristic features of the invention are susceptible of modification, still the preferred embodiment of the invention is illustrated in the accompanying drawings, in which—

Figure 1 is a top plan view of the implement, showing, essentially, the structure for which I desire to obtain patent. Fig. 2 is a side elevation of the harrow. Fig. 3 is a sectional view about on the line X X of Fig. 2. Fig. 4 is a sectional view on the line Y Y of Fig. 1, being slightly enlarged and broken away.

Corresponding and like parts are referred to in the following description and indicated in all the views of the drawings by the same reference characters.

The implement comprises, essentially, a frame 1, having cutter-shafts 2 disposed thereon and provided in the rear of the said cutter-shafts with the harrow-teeth 3, which complete the pulverization and reduction of the soil in the operation of the same. The arrangement of the cutting-blades 4, which are of spiral form, is peculiar and is an important feature of the invention. These cutting-blades 4 are secured to arms 5, which extend from the cutter-shafts 2, being integrally formed therewith. The arms 5 are provided with slotted end portions 6, said end portions receiving the cutting-blades and transverse fastenings 7 secure the latter to the said arms. The fastenings 7 may be rivets or removable fastenings, as found most suitable. The cutter-shafts 2 are journaled upon main shafts 8, which shafts 8 are journaled between the side bars of the frame. The cutter-shafts 2 are arranged in sets upon each side of the supporting-bar 9, which is provided about intermediate of the side bars of the frame 1 and which supports the main shaft 8 at about a central point thereof. Each set of the shafts 2 comprises pairs of shafts disposed upon opposite sides of the supporting-bar 9 and disposed one set in advance of the other. At least one of the cutter-shafts mounted upon the main shafts is keyed to its respective shafts, these cutter-shafts being preferably those disposed upon the extreme right of the frame 1. In order to insure the revolution of the main shafts and facilitate the turning of the implement in its movement, a cross-bar 10 is provided and extends transversely of the frame 1 as a means of preserving to the greatest possible extent the rigidity of the frame. In rear of the main shafts are mounted the harrow-teeth 3 upon transverse shafts 11, the shafts 11 being adapted to receive a reciprocal movement when actuated by an ordinary form of lever 12, which may be adjustably locked in any desired position by means of a latch means 13. The harrow-teeth may thus be adjusted so as to increase the pulverizing action thereof, this adjustment depending greatly upon the character of the soil which is being cultivated, as will be readily understood. The shafts 11 are connected together for simultaneous movement upon actuation of the levers 12 by a bar 14, pivotally secured to the said shafts.

As before mentioned, the peculiar disposal and arrangement of the cutting devices is essential to the spirit of the invention and the practical operation of the implement. The spiral pairs of blades disposed upon each side of the supporting-bar 9 and upon each of the main shafts are oppositely inclined in their spiral disposition, those pairs of blades 4 which are in advance being farther oppositely inclined with reference to those journaled upon the main shaft 8. In other words, diagonally-opposite blades of the respective front and rear cutter-shafts are inclined in the same direction. The blades 4 thus are adapted to cut the soil into strips as the machine advances, the arrangement of the strips after being cut being somewhat in the form of a parallelogram. The blades not only cut the strips as the implement advances, but gouge into the soil in such a manner as to separate the side strips and throw them up. After the strips have been cut in the manner above described the pulverization of the soil is accomplished by the harrow-teeth 3, which are disposed in rear of the aforesaid cutter-blade. The pulverization of the strips is more readily attained because of the peculiar disposal thereof due to the arrangement of the cutting devices.

It is intended to use in connection with the pulverizing mechanism hereinbefore described a seeder-shaft journaled to the frame in any suitable manner and operable by the rotation of one of the main shafts, said shaft being provided for this purpose with an angular end 15, which may receive a sprocket-wheel or the like, and thus be connected to the seeder-shaft. The said mechanism may thus be operated synchronously with the cultivator mechanism. Since, however, the seeding mechanism is not the subject of my invention, I have not illustrated the same for this reason.

Having thus described the invention, what is claimed as new is—

1. In an implement of the class described, the combination with a frame, main shafts disposed one in advance of the other and approximately at a right angle to the line of draft, cutter-shafts journaled to the aforesaid main shafts, spiders projected from the aforesaid cutter-shafts, spiral clod cutting and crushing blades secured to the arms of the aforesaid spiders and radially disposed relative to the cutter-shafts aforesaid, the spiral blades upon the respective front and rear shafts being oppositely inclined whereby the earth is cut into angularly-disposed strips by operation of the advanced cutting-blades and said strips are cut at an opposite angle by operation of the rear cutting-blades.

2. In an implement of the class described, the combination with a frame, of main shafts disposed thereon at approximately right angles to the line of draft and one in advance of the other, independent cutter-shafts journaled to the aforesaid shafts, spiders projected from the said cutter-shafts, spiral radially-disposed clod crushing and cutting blades secured to the arms of said spiders, said clod-cutting blades being oppositely inclined upon opposite sides of a medial line so as to centralize the draft, the advanced cutting-blades also being inclined oppositely to those upon the rear main shafts whereby the ground is cut into angularly-disposed strips by the forward cutting-blades and said strips cut into clods by the action of the rear oppositely-inclined cutting-blades; and cutting-teeth located in rear of the main shaft of the frame and adapted to cut the clods in the direction of the line of draft to effect a thorough pulverization of the earth after cutting thereof by the angularly-disposed cutting-blades.

SILAS H. WOOSTER.

Witnesses:
SARA W. ENO,
GEO. H. CARR.